April 5, 1960     J. C. THORESEN     2,932,014
ELECTRICAL POSITION-INDICATING APPARATUS
Filed Oct. 12, 1956
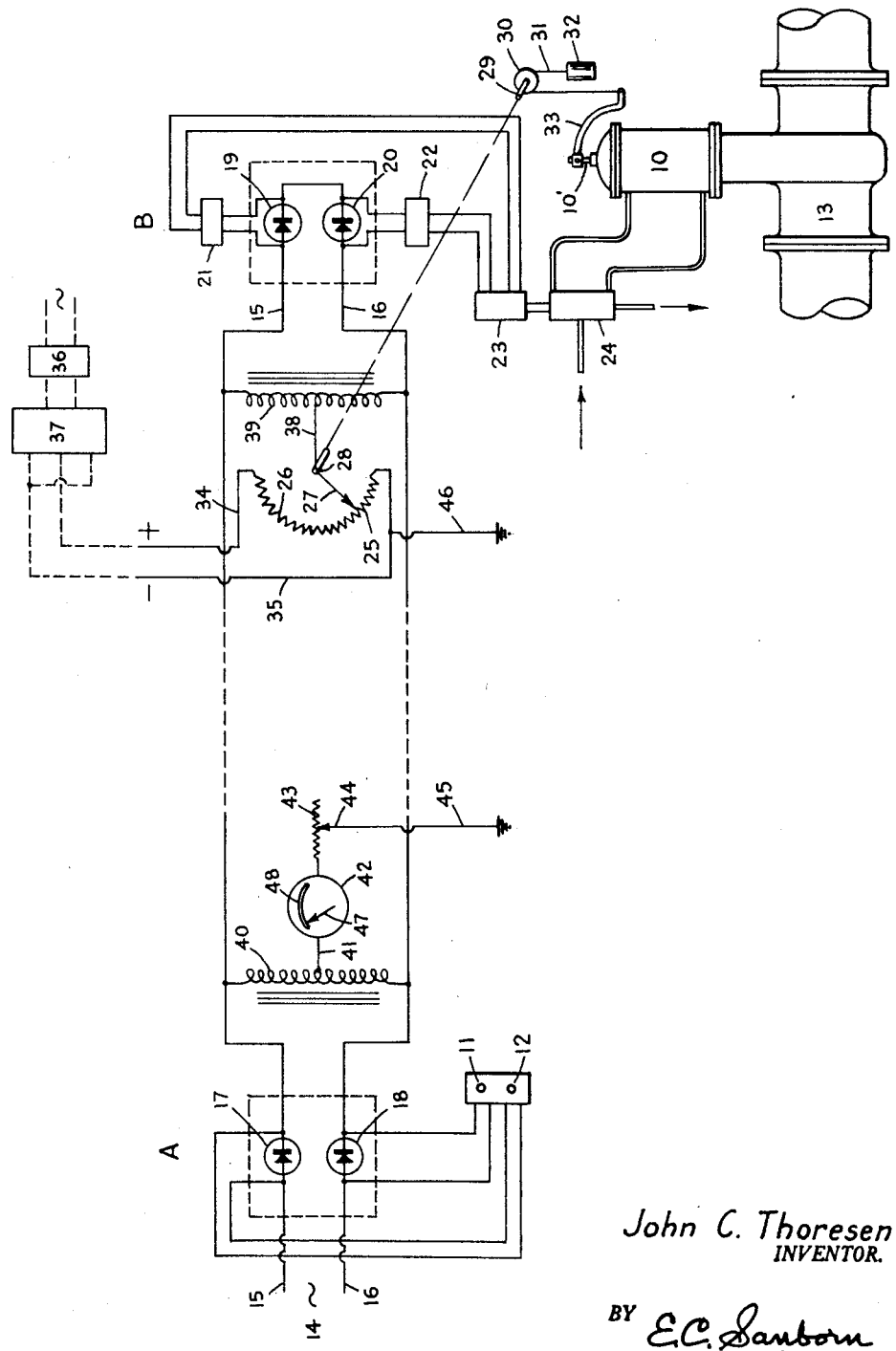
John C. Thoresen
INVENTOR.
BY E.C. Sanborn
Attorney

United States Patent Office 2,932,014
Patented Apr. 5, 1960

2,932,014

ELECTRICAL POSITION-INDICATING APPARATUS

John C. Thoresen, Warwick, R.I., assignor to B-I-F Industries, Inc., Providence, R.I., a corporation of Rhode Island Application October 12, 1956, Serial No. 615,563

4 Claims. (Cl. 340—177)

This invention relates to apparatus for the remote indication of the position of a movable element, and is more particularly concerned with the provision of a novel and highly efficient position-indicating means especially adaptable to circuits such as leased telephone lines where the primary function involves alternating currents. The chief obstacle to superimposing prior indicators on such transmission lines has been the interference of the indicator currents with those effecting the primary function of the lines. My invention effectively overcomes this obstacle while enabling the position of an object, such as a distant valve controlled by impulses from a transmitting station, to be accurately indicated at that station.

Other features and advantages of the invention will appear from the ensuing description.

In the accompanying drawing there is shown schematically an embodiment of the invention wherein a valve at a distant station is controlled by electrical impulses sent over a line from a transmitting station, and the position of the valve is shown at the transmitting station by means connected to said line.

The position of the valve may be controlled in the same manner as disclosed in my copending application, Serial No. 553,773, filed December 19, 1955, now abandoned. In the accompanying drawing, the position of the valve 10 is controlled in the same manner as in Fig. 4 of the above-mentioned application.

More particularly, referring to the drawing, two telemetric switching devices or transmitters 11, 12, are shown at the transmitting station A for controlling the opening and closing of a valve 10 at a distant receiving station B for regulating the flow of fluid in a conduit 13. Alternating current (which may be of standard 60-cycle frequency) is supplied from a source 14 at the transmitting station to the lines 15, 16. Included in these lines at the transmission station are rectifiers 17 and 18, preferably of the selenium type, which are oppositely poled with respect to the circuit, as illustrated.

At the receiving station B, rectifiers 19 and 20, also preferably of the selenium type, are included in the lines 15 and 16. Rectifier 19 should be poled in the same way as rectifier 17, and has one terminal thereof connected to conductor 15 and the other to one terminal of rectifier 20. The latter rectifier has its other terminal connected to line 16, and should be poled in the same way as rectifier 18.

The telemetric switching devices or transmitters 11 and 12, may be ordinary manually operable switches, and are connected in parallel with the rectifiers 17, and 18, respectively, at the transmitting station. At the receiving station B, a pair of relays 21 and 22 are connected in parallel with the respective rectifiers 19 and 20. These relays may be of conventional type and are connected to a single two-way electric solenoid 23 (also of well-known type) arranged in one condition (controlled by relay 22) to open a hydraulic pilot valve 24 and in the other condition (controlled by relay 21) to cause movement of said valve to closed position. The relay 21 and solenoid 23 thus form one telemetric receiver while the relay 22 and solenoid 23 form another telemetric receiver. Pilot valve 24, in turn, controls the flow valve 10 in the pipe 13.

When it is desired to move the valve 10 toward open position, the switch 11 is closed. Then in those half cycles of the alternating voltage in which a positive voltage is applied to the wire 15, assuming the rectifiers to be poled so as to pass current from left to right in the drawing, current will flow through rectifier 17, rectifier 19, around the rectifier 20 through the coil of relay 22, conductor 16, and the closed contacts of switch 11, around the rectifier 18, and back to conductor 16. Because of their polarity, current will not flow through rectifiers 20 and 18.

The relay 22 being now energized, its contacts close to cause the electric solenoid 23 to assume a position in which the hydraulic pilot valve 24 will effect movement of the flow control valve 10 toward open position, permitting increased flow of fluid through the pipe 13.

In the alternate half cycles in which the voltage applied to the conductor 15 is negative, no current will flow, since current cannot now pass through rectifier 17, and the latter cannot be by-passed since the switch 12 is open. Furthermore, relay 22 is now short-circuited by rectifier 20, so that said relay would not be energized even if current could flow in said alternate half cycles. In short, during the half cycles in which the voltage applied to conductor 15 is negative, the relay 22 is not energized; but during the half cycles in which the voltage applied to the conductor 15 is positive, the relay 22 will be energized or deenergized depending solely upon whether the contacts of the switch 11 are closed or open. The relay 22 should, of course, have sufficient shading so as not to change its condition or chatter during the interval between alternate half cycles of the alternating current while the switch is closed.

If it is desired to move the valve 10 toward closed position, the switch 12 is closed. Thereupon, during those half cycles in which the voltage applied to the conductor 16 is positive, current flows through rectifiers 18 and 20, thence around rectifier 19 through the coil of relay 21, conductor 15, around the rectifier 17 through the closed contacts of switch 12, and thence back to conductor 15. Because of their polarity, current will not flow through rectifiers 19 and 17.

The relay 21 being now energized, its contacts are closed to cause the electric solenoid to assume a position in which the hydraulic pilot valve 24 will effect movement of the flow control valve 10 toward closed position, decreasing the flow of fluid through the pipe 13.

In the alternating half cycles in which the voltage applied to the conductor 16 is negative, no current will flow, even though the switch 12 be held closed, since current cannot now pass through rectifier 18, and the latter cannot be by-passed since the switch 11 is open. Furthermore, relay 21 is now short-circuited by rectifier 19, so that said relay would not be energized even if current could flow in said alternate half-cycles. In short, during the half cycles in which the voltage applied to conductor 16 is negative, the relay 21 is not energized; but during the half cycles in which the voltage applied to the conductor 16 is positive, the relay 21 will be energized or deenergized depending solely upon whether the contacts of the switch 12 are closed or open. The relay 21, like relay 22, should have sufficient shading so as not to change its condition or chatter during the interval between alternate half cycles of the alternating current while switch 12 is closed.

As previously noted, the system above described for controlling the position of the valve 10 is disclosed in Fig. 4 of my pending application, Serial No. 553,773. My present invention enables the position of the valve to be indicated accurately at the transmitting station without interference with the control function of the alternating current in the lines 15, 16 or impairment of the precision of control over the positioning of the valve.

For applying my invention to the control system illustrated in the drawings, I have shown at the receiving station B a potentiometer 25, comprising a slide wire 26 engageable by a contact 27 which is connected to the stem 10' of the valve 10 for movement therewith. Conveniently, the contact 27 may be moved about the axis of a shaft 28 through suitable linkage connecting said shaft with a shaft 29 to which is fixed a pulley 30. A cable 31 passes over said pulley and is connected at one end to a weight 32 and at its other end to a bracket 33 fixed to the valve stem 10'. Thus, as the valve moves downwardly, the cable 31 imparts counter-clockwise rotation to the shaft 29; while, on the other hand, when the valve moves upwardly said shaft is turned clockwise by said cable under the action of said weight 32. The contact 27 thus moves in one direction or the other along the slide wire 26, depending upon the direction of movement of said valve.

The slide wire 26 is connected at its respective ends to wires 34, 35, supplied with direct current from any suitable source. As shown, such direct current source may comprise a constant-voltage transformer 36, supplied with alternating current from a source which may be the same as the source 14, and a full wave rectifier and filter 37 connected to said transformer and in turn supplying direct current to the wires 34, 35.

The movable contact 27 is connected by a wire 38 to the midpoint of a choke coil 39 connected across the mains 15, 16 at the receiving station. A similar choke coil 40 is shown connected across said mains at the transmitting station, and has its midpoint connected by wire 41 to a voltmeter 42. The latter, in turn, is connected to ground through a balancing resistance 43, movable contact 44, and wire 45. The end of the potentiometer slide wire 26 to which wire 35 is connected is also shown connected to ground through a wire 46.

It will be seen that the full D.C. voltage is applied from the D.C. mains 34, 35, across the potentiometer slide wire 26 and that the movable potentiometer contact 27 picks off from the slide wire a D.C. voltage which corresponds in magnitude to the position of the valve stem 10', and applies that voltage to the midpoint of the choke coil 39. A circuit is provided from the direct current main 34 through the adjacent portion of slide wire 26 to contact 27, wire 38, the midpoint of coil 39, the adjacent halves of said coil, the alternating current mains 15 and 16, the halves of the choke coil 40 connected to said mains, the midpoint of said coil 40, wire 41, the voltmeter 42, resistance 43, contact 44, wire 45, to ground, and the direct current return main 35. The voltmeter thus responds to the voltage between the potentiometer contact 27 and the ground, which voltage, as above noted, varies in magnitude with the position of the valve stem; and thus the voltmeter pointer 47 is positioned in accordance with said valve stem position. The scale 48 with which said pointer coacts may be calibrated to show the valve position in any desired units.

It will be observed that the alternating current lines 15 and 16 act together as one carrier for the direct current in the voltmeter circuit, since the center taps of the choke coils 39 and 40 divide the current equally between these lines. This equal division of the direct current between the alternating current lines also assures that each will be at the same D.C. potential, wherefore no interference with the primary function of said lines can occur as the result of direct current flow therein. Furthermore, said choke coils 39 and 40 present very high impedance to the primary or control impulses passing in the lines 15 and 16 to the valve control relay 21 or 22, since those impulses are alternating current. Thus, the presence of these coils 39, and 40, while readily permitting flow of the direct current to the position-indicating voltmeter, does not provide stray paths for the primary function impulses or otherwise interfere with them.

It will be apparent that the choke coil at each station could consist of two choke coils of identical size connected in series, with provision for the connection of the potentiometer contact or voltmeter (as the case may be) to a suitable point between those coils, instead of a single coil with a midpoint tap for such connection. It will also be apparent that the voltmeter may be of the well-known recording type so that a permanent record of the positions of the valve 10 may be obtained.

It may be further noted that, through the switches 11 and 12, the valve 10 may be moved not only to fully open and fully closed positions, but also to any desired intermediate position by merely holding the switch 11 or 12 closed until that position is indicated by the voltmeter 42 at the transmitting station. Accurate positioning of the valve in the desired position is readily achieved merely by actuating the switch 11 or 12 for an appropriate instant to "nudge" the valve to the exact position desired. The system above described enables the valve to be positioned accurately and precisely, and its position to be exhibited instantaneously, throughout the range of movement of the valve.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for controlling from a telemetric transmitting station the position of an object adjustable between two extreme positions at a distant receiving station connected to an alternating current two conductor line to said transmitting station and for indicating the position of said object at said transmitting station, comprising means at said transmitting station for sending over said line alternating current impulses for controlling the position of said object, control means at said receiving station responsive to said alternating current impulses for adjusting the position of said object between said extreme positions, means at said receiving station for deriving a direct current voltage representative of the instantaneous position of said object relative to said extreme positions, and means for applying to each of the conductors of said alternating current line substantially half of the direct current due to said voltage, said last mentioned means including means for dividing said direct current between said conductors and thereby rendering said direct current ineffective to actuate said control means, and means at said transmitting station connected across said conductors substantially non-conductive to alternating current impulses for combining said direct currents, and means responsive to the voltage of said combined direct current for providing a representation of the instantaneous position of said object relative to said extreme positions.

2. Apparatus for controlling from a telemetric transmitting station the position of an object adjustable between two extreme positions at a distant receiving station connected by an alternating current two conductor line to said transmitting station and for indicating the position of said object at said transmitting station, comprising means at said transmitting station for sending over said line alternating current impulses for controlling the position of said object, control means at said receiving station responsive to said alternating current impulses for adjusting the position of said object between said extreme positions, choke means connected across said conductors at said receiving station, means at said receiving station for deriving and applying to the midpoint of said choke means a direct current voltage representative of the instantaneous position of said object relative to said extreme positions whereby substantially half of the direct current due to said voltage is applied to each of said conductors, second choke means at said transmitting station connected across said conductors, means connected to the midpoint of said second choke means and responsive to the voltage of said direct current for providing a representation of the instantaneous position of said object relative to said extreme positions.

3. Apparatus for cooperation with a supply line connected to a source of alternating voltage and extending between telemetric transmitting and receiving stations, said apparatus comprising means at said transmitting station for controlling the passage over said line from said alternating voltage source of a set of control pulses, means at said receiving station responsive to said control pulses for moving an object in one direction for an extent corresponding to the duration of said pulses, means at said transmitting station for controlling the passage over said line from said alternating voltage source of a second set of control pulses distinct from the first set, means at said receiving station responsive to said second set of pulses for moving said object in another directon to an extent corresponding to the duration of said pulses, choke means connected across said supply line at said receiving station, means at said receiving station for deriving and applying to the midpoint of said choke means a direct current voltage representative of the position of said object, second choke means at said transmitting station connected across said supply line, and means connected to the midpoint of said second choke means and responsive to said direct current voltage for providing an indication corresponding to the position of said object.

4. Apparatus for controlling from a telemetric transmitting station the value of a variable at a distant receiving station connected by an alternating current two-conductive path to said transmitting station and for indicating the value of said variable at said transmitting station, comprising means for coupling said line to a source of alternating current, first and second telemetric switching devices at said transmitting station and each arranged, in a predetermined condition thereof, to pass alternating current impulses, first and second telemetric receiving devices at said receiving station each arranged, in response to the passage of current therethrough, to cause said variable to assume a corresponding value, a respective pair of each of said switching and receiving devices being intercoupled through one of said paths, a rectifier for each of said switching devices and receiving devices, each of said rectifiers being connected in parallel with a corresponding one of said switching and receiving devices, the rectifiers connected in parallel with the switching device and receiving device of one of said pairs being poled so as to pass said alternating current impulses in one direction and the rectifiers connected in parallel with the switching device and receiving device of the other of said pairs being poled so as to pass alternating current pulses in the opposite direction whereby the switching device and receiving device of one of said pairs operate telemetrically only on the positive alternations of said current and the switching device and receiving device of the other of said pairs operate telemetrically only on the negative alternations of said current, choke means connected across said paths at said receiving station, means at said receiving station for deriving and applying to the midpoint of said choke means a direct current voltage representative of the value of said variable, second choke means at said transmitting station connected across said paths, and means connected to the midpoint of said second choke means and responsive to said direct current voltage for providing an indication corresponding to the value of said variable.

References Cited in the file of this patent

UNITED STATES PATENTS

| | | |
|---|---|---|
| 2,209,565 | Harris et al. | July 30, 1940 |
| 2,338,872 | Robidoux | Jan. 11, 1944 |
| 2,347,523 | Suksdorf | Apr. 25, 1944 |
| 2,749,534 | Threadgold | June 5, 1956 |

FOREIGN PATENTS

| | | |
|---|---|---|
| 337,896 | Great Britain | Nov. 13, 1930 |